US012327908B2

(12) United States Patent
Carpenter

(10) Patent No.: US 12,327,908 B2
(45) Date of Patent: Jun. 10, 2025

(54) ANTENNA WITH A HEAT SINK FOR A METER

(71) Applicant: Honeywell International Inc., Morris Plains, NJ (US)

(72) Inventor: Kerrance Carpenter, Wake Forest, NC (US)

(73) Assignee: Honeywell International Inc., Charlotte, NC (US)

( * ) Notice: Subject to any disclaimer, the term of this patent is extended or adjusted under 35 U.S.C. 154(b) by 275 days.

(21) Appl. No.: 17/248,192

(22) Filed: Jan. 13, 2021

(65) Prior Publication Data

US 2022/0224014 A1 Jul. 14, 2022

(51) Int. Cl.

| | |
|---|---|
| ***H01Q 1/22*** | (2006.01) |
| ***H01Q 1/02*** | (2006.01) |
| ***H01Q 5/20*** | (2015.01) |
| ***H01Q 9/04*** | (2006.01) |
| *H01Q 1/38* | (2006.01) |

(52) U.S. Cl.

CPC ............. *H01Q 1/2233* (2013.01); *H01Q 1/02* (2013.01); *H01Q 5/20* (2015.01); *H01Q 9/0421* (2013.01); *H01Q 1/38* (2013.01)

(58) Field of Classification Search

CPC ........... H01Q 1/38; H01Q 1/02; H01Q 1/2233

See application file for complete search history.

(56) References Cited

U.S. PATENT DOCUMENTS

| | | | | |
|---|---|---|---|---|
| 4,904,995 | A * | 2/1990 | Bonner | H01Q 1/2233 340/12.37 |
| 8,723,750 | B2 * | 5/2014 | Podduturi | H01Q 1/38 343/702 |
| 2014/0292593 | A1 | 10/2014 | Thiam et al. | |
| 2016/0218764 | A1 * | 7/2016 | Yamamoto | H01Q 1/02 |
| 2018/0301799 | A1 * | 10/2018 | Imai | H01Q 1/24 |
| 2018/0342784 | A1 * | 11/2018 | Samardzija | H01Q 1/38 |
| 2018/0358710 | A1 * | 12/2018 | Toyao | H01Q 15/148 |
| 2019/0041920 | A1 * | 2/2019 | Spanier | H01Q 1/2233 |
| 2019/0268045 | A1 * | 8/2019 | Pollman | H01Q 21/24 |
| 2020/0008311 | A1 * | 1/2020 | Belloul | H01Q 1/2291 |
| 2021/0226316 | A1 * | 7/2021 | Migliorino | H01Q 9/0421 |

(Continued)

FOREIGN PATENT DOCUMENTS

TW M488109 U 10/2014

OTHER PUBLICATIONS

Seko, M., "Penta-band antenna for global system for mobile communications/digital cellular system/personal communications service/universal mobile telecommunications system/wireless local area network operation in portable devices" IIET Microw. Antennas Propag., 2019, vol. 13 Iss. 7, pp. 930-935 (6 pages total).

(Continued)

*Primary Examiner* — Ab Salam Alkassim, Jr.

(74) *Attorney, Agent, or Firm* — John Maldjian, Esq.; Stevens & Lee PC

(57) ABSTRACT

One embodiment is a device comprising a primary radiator tuned to a plurality of bands, a ground plane connected to the primary radiator, and a heat sink connected to the ground plane, the heat sink configured to extend the ground plane which enables the modification of at least one property of the primary radiator.

9 Claims, 4 Drawing Sheets

(56) References Cited

U.S. PATENT DOCUMENTS

| | | | | |
|---|---|---|---|---|
| 2024/0429591 | A1* | 12/2024 | Spanier | H01Q 1/243 |
| 2024/0429592 | A1* | 12/2024 | Wei | H01Q 1/44 |

OTHER PUBLICATIONS

Itron, Inc. "Itron Unveils New 4G LTE Smart Meter Solution" Feb. 25, 2015; Retrieved from: https://www.tdworld.com/smart-utility/article/20965119/itron-unveils-new-4g-lte-smart-meter-solution#:~:text=ltron%2C%20Inc.%20has%20launched%20its,4G%20LTE%20technology%20available%20today. (10 pages total).

* cited by examiner

ANTENNA WITH A HEAT SINK FOR A METER

CROSS-REFERENCE TO RELATED APPLICATIONS

None

BACKGROUND

Gas and water meters are disparately located and require a very-efficient, compact antenna to communicate with a controller or other network for functionality. Typically, the meter location is a very unfriendly environment to antennas. Most meters have very little space for the antenna and the antenna is located close to other metal structures. For example, a typical meter has the antenna located near the meter's large metal housing and can often be secured using a metal face-plate and a plurality of screws.

All of these structures can interfere with the antenna performance. In the case of potted meters, the antenna can also be hindered by water-proofing compounds. Moreover, the antennas must be intrinsically safe, which constrains many traditionally effective antenna design strategies. For at least these reasons, the utility metering industry has difficulty achieving good range with a cellular radio.

SUMMARY OF THE INVENTION

One embodiment is a device comprising a primary radiator tuned to a plurality of bands, a ground plane connected to the primary radiator, and a heat sink connected to the ground plane, the heat sink connected substantially perpendicular to the ground plane, the heat sink configured to extend the ground plane, wherein the primary radiator is connected in series with the ground plane and the heat sink, the connection creating a first resonance which enables the modification of at least one property of the primary radiator.

Another embodiment is a system. The system includes a radiation system tuned to a plurality of bands, a ground plane system connected to the radiation system, and a heat sink system connected to the ground plane system, the heat sink system connected substantially perpendicular to the ground plane system, the heat sink system configured to extend the ground plane system, wherein the radiation system is connected in series with the ground plane system and the heat sink system, the connection creating a first resonance which enables the modification of at least one property of the radiation system.

In another embodiment, a meter is provided. The meter includes a housing including at least one waterproofing element, a radiator tuned to a plurality of bands, the radiator enclosed in a cage connected to the housing and secured with a face-plate by a plurality of connection elements, a ground plane connected to the radiator, and a heat sink connected to the ground plane, the heat sink connected substantially perpendicular to the ground plane, the heat sink configured to extend the ground plane, wherein the radiator is connected in series with the ground plane and the heat sink, the connection creating a first resonance which enables the modification of at least one property of the radiator.

DETAILED DESCRIPTION OF THE INVENTION

Figure 1:
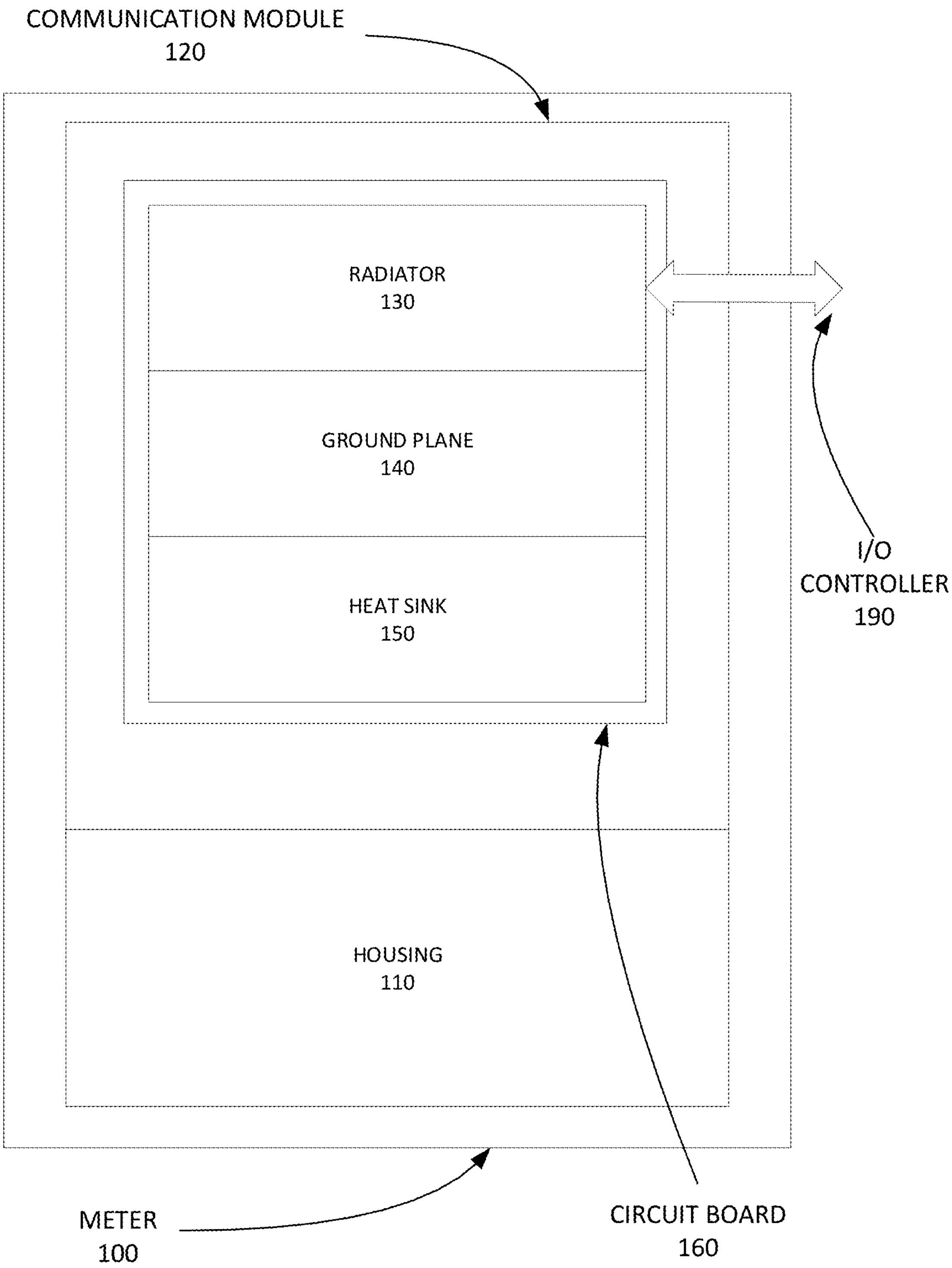
FIG. 1 is a diagram of an antenna with a heat sink for a meter according to one embodiment.

FIG. 1 is a diagram of an antenna with a heat sink for a meter according to one embodiment. A meter 100 includes a housing 110 and a communication module 120. The housing is a physical device, typically made of metal, which enables gas or water to flow through the housing to be controlled, metered, or otherwise utilized. The communication module 120 is connected to the housing and can communicate externally with a controller or other operator.

The communication module 120 is capable of sending and receiving signals over the air, via an I/O controller 190, which in turn can be used to control the physical operation of the meter 100. For example, the communication module 120 could be used to communicate the state of the meter 100 to a human operator, who in turn could send a signal back to the communication module 120 which causes it to alter the state of the water and gas flowing through the housing 110, for instance by shutting off a valve in the housing 110.

The communication module 120 is comprised of a radiator 130, a ground plane 140, and a heat sink 150. The radiator 130, the ground plane 140 and the heat sink 150 are attached to a circuit board 160. In one example, the radiator 130 is tuned to a plurality of bands. These could be, for example, LTE or other over the air bands. In some embodiments, the radiator is an LTE antenna tuned to bands 2, 4, 5, 12, and 13. Any suitable radiator 130 can be used. In some examples, the radiator 130 is stamped metal and can be in the form of a planar inverted-F antenna (PIFA).

The radiator 130 is connected to a ground plane 140 which is shown as block 140 for purposes of example only. The ground plane 140 typically encompasses all of the circuit board 160 except the portion where the radiator 130 resides. The heat sink 150 is connected to the ground plane 140. The heat sink 140 is configured to extend the ground plane 140, such that the radiator 130 can more effectively process LTE bands 12 and 13, without increasing the physical size of the communication module 120. To that end, the heat sink 150 can be connected substantially perpendicular to the ground plane 140.

In operation, when the radiator 130 is connected in series with the ground plane 140 and the heat sink 150 on the circuit board 160, the connection creates a first resonance in the communication module 120. The first resonance enables the modification of at least one property of the radiator 130. In one example, the modification includes compacting the signals of longer wavelength bands, such as LTE bands 12 and 13, such that the communication module 120 can utilize them with a smaller size of the ground plane 140, and hence, the communication module 120.

Figure 2:
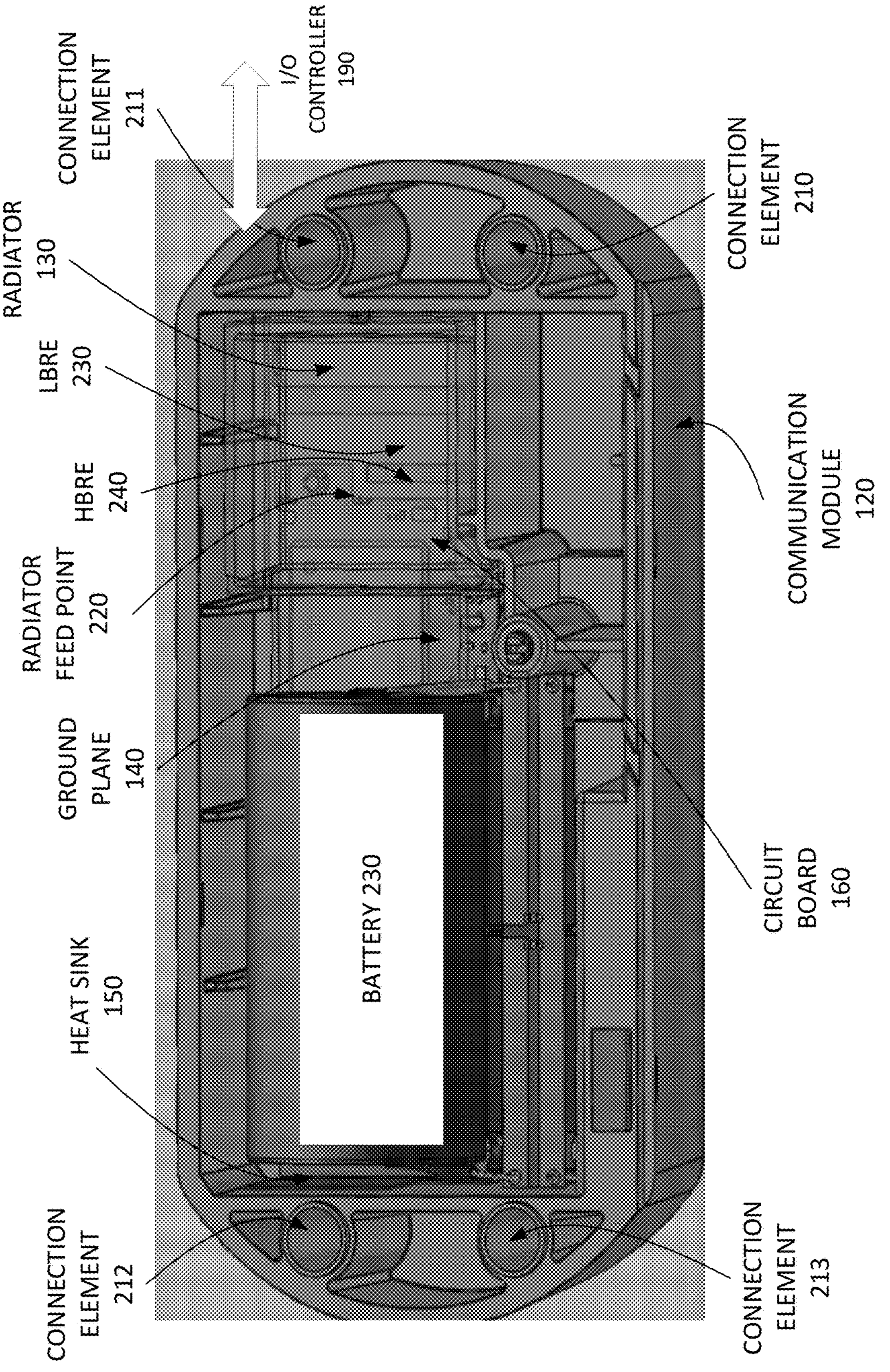
FIG. 2 is a diagram of the antenna with the heat sink for the meter according to another embodiment.

FIG. 2 is a diagram of the antenna with the heat sink for the meter according to another embodiment. In FIG. 2, the communication module 120 is shown in more detail. The communication module 120 is connected to a meter housing (not shown) and can communicate externally with a controller or other operator. The communication module 120 is capable of sending and receiving signals over the air, which in turn can be used to control the physical operation of the meter (not shown). Typically, a face-plate (not shown) is placed directly on top of the communication module 120. The face-plate encloses and protects the communication module from humans and the environment. The face-plate is typically comprised of a metal, although other types of face-plates can be used as well.

The face-plate connects to the communication module via connection elements 210, 211, 212, and 213. The connection elements can be a variety of connectors. In one example, four metal screws are used to secure the face-plate to the communication module 120. The communication module 120 also includes a battery 230 which supplies the power needed for the communication module 120 to perform I/O operations via I/O controller 190.

The communication module 120 is further comprised of a radiator 130, a ground plane 140, and a heat sink 150. The radiator 130, the ground plane 140 and the heat sink 150 are attached to a circuit board 160. In one example, the radiator 130 is tuned to a plurality of bands. These could be, for example, LTE or other over the air bands. In some embodiments, the radiator is an LTE antenna tuned to bands 2, 4, 5, 12, and 13. In the example of FIG. 2, the radiator 130 is a stamped metal PIFA which is capable of utilizing a wide range of bands in a small area. In this example, the radiator 130 includes a low-band radiating element (LBRE) 230 and a high-band radiating element 240.

The radiator 130 is connected to a ground plane 140. The ground plane 140 encompasses all of the circuit board 160 left of a radiator feed point 220. The heat sink 150 connected to the ground plane 140. The heat sink 140 is configured to extend the ground plane 140, such that the radiator 130 can more effectively process LTE bands 12 and 13, without increasing the physical size of the communication module 120. To that end, the heat sink 150 can be connected substantially perpendicular to the ground plane 140. It should also be noted that the heat sink 140 is substantially perpendicular to the face-plate (not shown).

In operation, when the radiator 130 is connected in series with the ground plane 140 and the heat sink 150 on the circuit board 160, the connection creating a first resonance in the communication module 120. The first resonance enables the modification of at least one property of the radiator 130. In one example, the modification includes compacting the signals of longer wavelength bands, such as LTE bands 12 and 13, such that the communication module 120 can utilize them with a smaller size of the ground plane 140, and hence, the communication module 120. It should also be noted that merely increasing the size of the ground plane 140 is not sufficient, as this would increase the size of the face plate, and hence, make the interference with the radiator 130 even grater.

Figure 3:
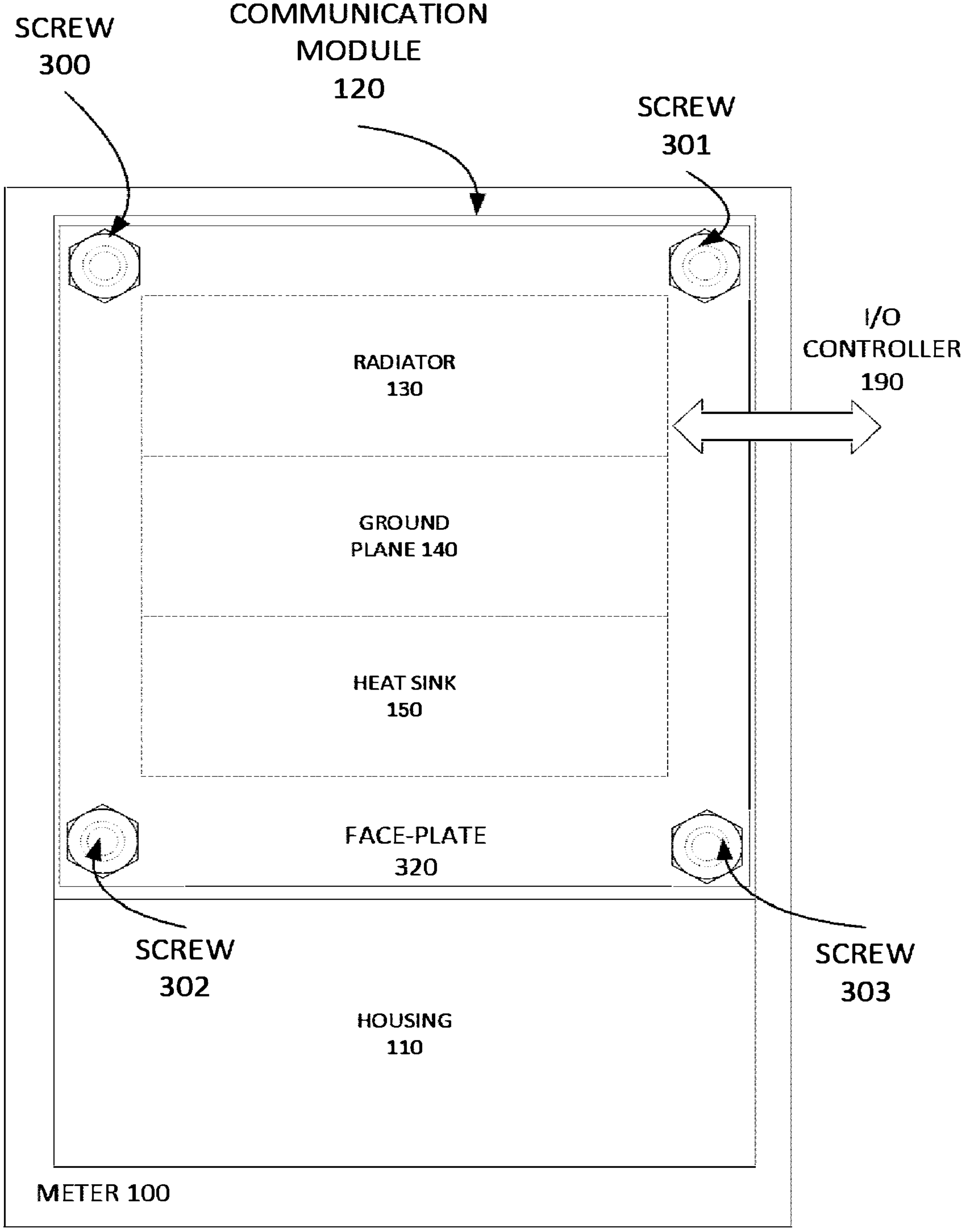
FIG. 3 is a diagram of the antenna with the heat sink for the meter according to another embodiment.

FIG. 3 is a diagram of the antenna with the heat sink for the meter according to one embodiment. In FIG. 3, the communication module 120 is connected to a meter housing 110 of a meter 100 and can communicate externally with a controller or other operator via an I/O controller 190. The communication module 120 is capable of sending and receiving signals over the air, which in turn can be used to control the physical operation of the meter 100. A face-plate 320 is placed directly on top of the communication module 120. The face-plate 320 encloses and protects the communication module 120 from humans and the environment. The face-plate 320 is typically comprised of a metal, although other types of face-plates 320 can be used as well.

The face-plate 320 connects to the communication module 120 via screws 300, 301, 302, and 303. The screws 300, 301, 302, and 303 can be any variety of screw suitable to secure the face-plate 320. In one example, four metal screws are used to secure the face-plate to the communication module 120. The communication module 120 is comprised of a radiator 130, a ground plane 140, and a heat sink 150. The radiator 130, the ground plane 140 and the heat sink 150 are attached to a circuit board 160 (not shown) and are depicted as dotted lines since they are not visible underneath the face-plate 320. In one example, the radiator 130 is tuned to a plurality of bands. These could be, for example, LTE or other over the air bands. In some embodiments, the radiator is a PIFA antenna tuned to LTE bands 2, 4, 5, 12, and 13.

The radiator 130 is connected to a ground plane 140 at one side of the circuit board 160 (not shown). The heat sink 150 is connected to the ground plane 140 at an opposing side of the circuit board (not shown). The heat sink 140 is configured to extend the ground plane 140, such that the radiator 130 can more effectively process LTE bands 12 and 13, without increasing the physical size of the communication module 120. To that end, the heat sink 150 can be connected substantially perpendicular to the ground plane 140.

In operation, when the radiator 130 is connected in series with the ground plane 140 and the heat sink 150 on the circuit board 160, the connection creating a first resonance in the communication module 120. The first resonance enables the modification of at least one property of the radiator 130. In one example, the modification includes compacting the signals of longer wavelength bands, such as LTE bands 12 and 13, such that the communication module 120 can utilize them with a smaller size of the ground plane 140, and hence, the communication module 120.

Figure 4:
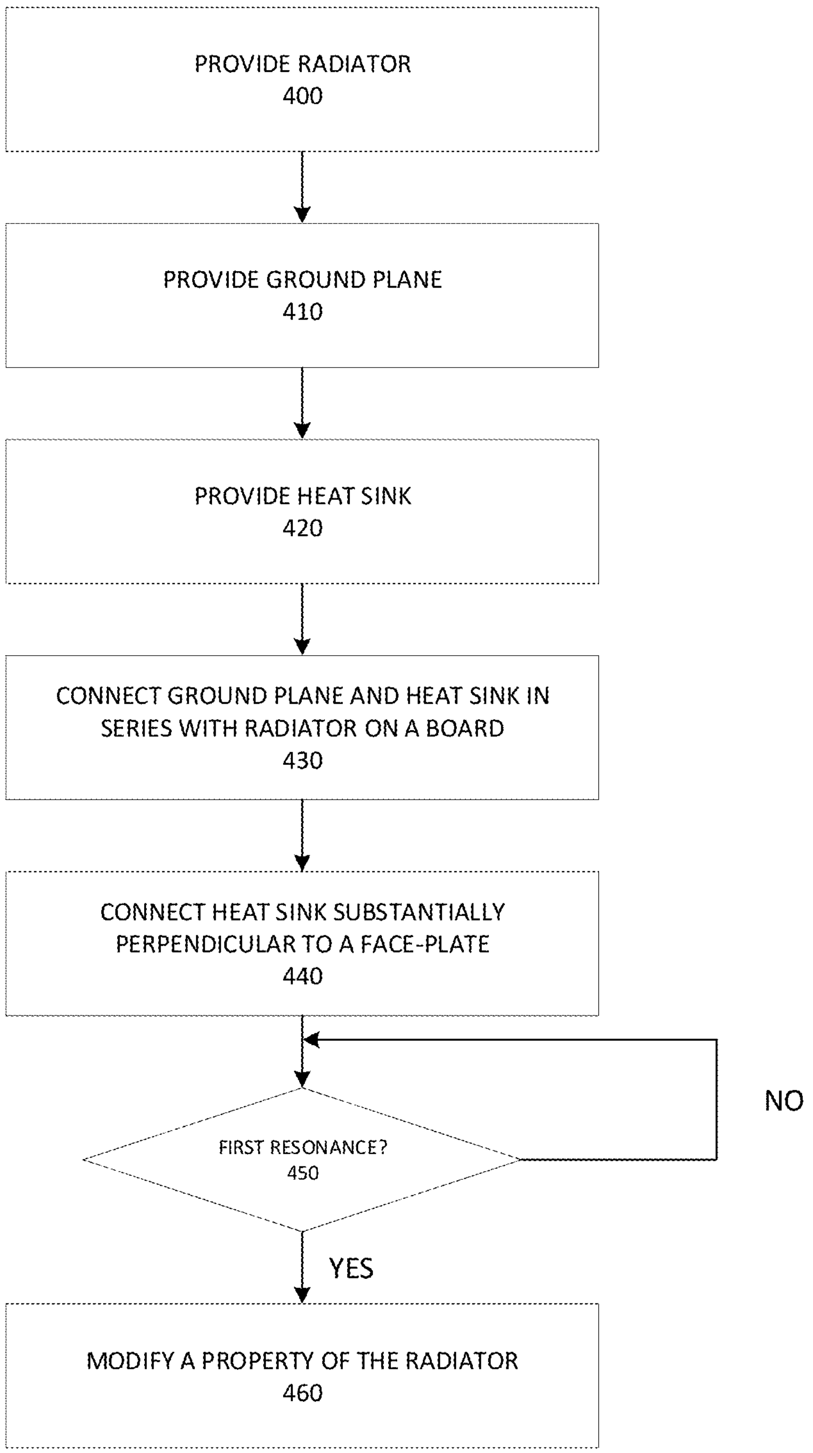
FIG. 4 is a flowchart that illustrates the operation of the antenna with the heat sink for the meter according to one embodiment.

FIG. 4 is a flowchart that illustrates the operation of the antenna with the heat sink for the meter according to one embodiment. At step 400, a radiator is provided. The radiator can be any radiator capable of cellular transmission. In one example, this includes an LTE antenna, such as a stamped metal PIFA radiator that can transmit in LTE band 2, LTE band 4, LTE band 5, LTE band 12, and LTE band 13. At step 410, a ground plane is provided. The ground plane can be connected to the radiator, for example, at a radiator feed point such that it provides energy to the radiator on a circuit board.

At step 420, a heat sink is provided. In one example, the heat-sink occupies one side of a circuit board, while the radiator occupies an opposing side of the circuit board with the ground plane essentially in between. This is connection is made at step 430, such that the ground plane and the heat sink are connected in series with the radiator on the board.

At step 440, the heat sink connection is made such that it is substantially perpendicular to a face-plate. The face-plate is generally parallel to the circuit board and resides on top of a controller housing where these components are secured. The connections create a first resonance in the system. When this resonance occurs at step 450, at least one property of the radiator is modified at step 460.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A meter device comprising:

a primary radiator tuned to a plurality of bands;

a ground plane connected to the primary radiator, wherein the ground plane encompasses all of a circuit board except a portion where the primary radiator resides; and a heat sink connected to the ground plane, the heat sink connected substantially perpendicular to the ground plane, the heat sink configured to extend the ground plane, wherein the primary radiator is connected in series with the ground plane and the heat sink, the heat-sink placed on one side of the circuit board and the primary radiator placed on an opposing side of the circuit board with the ground plane in between, wherein the ground plane connected to the primary radiator, and the heat sink, in combination, act as the ground plane for the primary radiator such that the arrangement creates a first resonance in a communication module, which enables the primary radiator to compact signals of longer wavelength bands to allow reception of LTE bands 12 and 13 signals.

2. The meter device of claim 1 wherein the primary radiator is configured as a stamped-metal PIFA radiator.

3. The meter device of claim 1 wherein the primary radiator, the ground plane, and the heat sink are components of a printed circuit board.

4. A meter system comprising:

a radiation system tuned to a plurality of bands;

a ground plane system connected to the radiation system, wherein the ground plane system encompasses all of a circuit board except a portion where the primary radiation system resides; and a heat sink system connected to the ground plane system, the heat sink system connected substantially perpendicular to the ground plane system, the heat sink system configured to extend the ground plane system, wherein the radiation system is connected in series with the ground plane system and the heat sink system, the heat sink system placed on one side of the circuit board and the radiation system placed on an opposing side of the circuit board with the ground plane system in between, wherein the ground plane connected to the primary radiator, and the heat sink, in combination, act as the ground plane for the primary radiator such that the arrangement creates a first resonance in a communication module, which enables the radiation system to compact signals of longer wavelength bands to allow reception of LTE bands 12 and 13 signals.

5. The meter system of claim 4 wherein the radiation system includes a stamped-metal PIFA radiator.

6. The meter system of claim 4 wherein the radiation system, the ground plane system, and the heat sink system are components of a printed circuit board.

7. A meter system comprising:

a housing; and a communication module connected to the housing and configured to communicate externally with a controller or other operator, wherein the communication module includes:

a primary radiator tuned to a plurality of bands;

a ground plane connected to the primary radiator, wherein the ground plane encompasses all of a circuit board except a portion where the primary radiator resides; and a heat sink connected to the ground plane, the heat sink connected substantially perpendicular to the ground plane, the heat sink configured to extend the ground plane, wherein the primary radiator is connected in series with the ground plane and the heat sink, the heat sink placed on one side of a circuit board and the primary radiator placed on an opposing side of the circuit board with the ground plane in between, wherein the ground plane connected to the primary radiator, and the heat sink, in combination, act as the ground plane for the primary radiator such that the arrangement creates a first resonance in the communication module, which enables the primary radiator to compact signals of longer wavelength bands to allow reception of LTE bands 12 and 13 signals.

8. The meter system of claim 7 wherein the primary radiator is configured as a stamped-metal PIFA radiator.

9. The meter system of claim 7 wherein the radiator, the ground plane, and the heat sink are components of a printed circuit board.

* * * * *